United States Patent [19]
Jander

[11] Patent Number: 6,029,897
[45] Date of Patent: Feb. 29, 2000

[54] METHOD OF DISPENSING CHOPPED REINFORCEMENT STRAND USING A VORTEX NOZZLE

[75] Inventor: Michael H. Jander, Kettenis, Belgium

[73] Assignee: N.V. Owens-Corning S.A., Brussels, Belgium

[21] Appl. No.: 09/044,638

[22] Filed: Mar. 19, 1998

[51] Int. Cl.[7] .................................................. B05D 1/00
[52] U.S. Cl. ...................... 239/8; 239/654; 239/DIG. 8
[58] Field of Search .................... 239/8, DIG. 8, 239/654

[56] References Cited

U.S. PATENT DOCUMENTS

| | | | |
|---|---|---|---|
| 2,810,157 | 10/1957 | Slayter et al. | 239/DIG. 8 X |
| 3,034,213 | 5/1962 | Miligan | 239/DIG. 8 X |
| 3,107,057 | 10/1963 | Hanusch | 239/DIG. 8 X |
| 3,126,157 | 3/1964 | Dickerson | 239/DIG. 8 X |
| 3,170,197 | 2/1965 | Brenner . | |
| 3,504,861 | 4/1970 | Peeps et al. | 239/8 X |
| 3,719,540 | 3/1973 | Hall . | |
| 3,831,879 | 8/1974 | Miller et al. . | |
| 3,977,069 | 8/1976 | Domaingue, Jr. . | |
| 4,001,935 | 1/1977 | Krohn et al. . | |
| 4,169,397 | 10/1979 | Vehling et al. . | |
| 4,178,670 | 12/1979 | Schmid . | |
| 4,417,937 | 11/1983 | Escher et al. . | |
| 4,487,365 | 12/1984 | Sperber | 239/8 |
| 4,519,281 | 5/1985 | Spaller . | |
| 4,630,515 | 12/1986 | Spaller . | |
| 4,750,960 | 6/1988 | Bubeck . | |
| 4,917,298 | 4/1990 | Henry | 239/8 |
| 4,944,446 | 7/1990 | Thompson . | |
| 5,020,403 | 6/1991 | D'Angelo . | |
| 5,131,590 | 7/1992 | Sperber | 239/8 |
| 5,158,631 | 10/1992 | Leoni et al. . | |
| 5,192,390 | 3/1993 | Perkins . | |
| 5,204,033 | 4/1993 | Pearce et al. . | |
| 5,262,106 | 11/1993 | Graham . | |
| 5,463,919 | 11/1995 | Paybarah et al. . | |

FOREIGN PATENT DOCUMENTS 1694724  8/1989  U.S.S.R. .

OTHER PUBLICATIONS

Michael Jander; Industrial RTM: New Developments In Molding And Preforming Technologies; pp. 1–10.

Mats Ericson; Processing, Structure And Properties Of Glass Mat Reinforced Thermoplastics; 1992; pp. 65–101.

Primary Examiner—Lesley D. Morris
Attorney, Agent, or Firm—Inger H. Eckert

[57] ABSTRACT

A method of dispensing a reinforcement strand includes the steps of chopping the reinforcement strand into discrete reinforcement fibers, directing the discrete reinforcement fibers into a dispensing nozzle so that the discrete reinforcement fibers travel along a path extending generally along a longitudinal axis of the nozzle, introducing a fluid into the nozzle in a circumferential direction with respect to the longitudinal axis, thereby creating a vortex of the fluid surrounding the discrete reinforcement fibers in the nozzle, dispensing the discrete length reinforcement fibers from the nozzle as a flow, and controlling the flow of fibers dispensed from the nozzle by controlling the fluid introduced into the nozzle.

29 Claims, 4 Drawing Sheets

METHOD OF DISPENSING CHOPPED REINFORCEMENT STRAND USING A VORTEX NOZZLE

TECHNICAL FIELD AND INDUSTRIAL APPLICABILITY OF THE INVENTION

This invention pertains to dispensing reinforcement fibers, and particularly in the dispensing of chopped reinforcement fibers to form a reinforced article, or to form a reinforcement mat or preform suitable for reinforcing molded articles, such as structural composites. More particularly, the invention pertains to receiving a continuous length of a reinforcement strand or roving, cutting the reinforcement strand into discrete lengths, and dispensing the discrete lengths onto a collecting surface.

BACKGROUND OF THE INVENTION

Structural composites and other reinforced molded articles are commonly made by resin transfer molding and structural resin injection molding. These molding processes have been made more efficient by preforming the reinforcement fibers into a reinforcement layer or mat, which is the approximate shape and size of the molded article, prior to inserting the reinforcements into the mold. To be acceptable for production at an industrial level, a fast preforming process is required. In the manufacture of preforms, a common practice is to supply a continuous length of reinforcement strand or fiber to a chopper, which chops the continuous fiber into many discrete length fibers, and deposits the discrete length fibers onto a collection surface. This process can be used to make preforms in an automated manner by mounting the reinforcement dispenser for movement over the collection surface, and programming the movement of the dispenser to apply the reinforcement fibers in a predetermined, desired pattern. The reinforcement dispenser can be robotized or automated, and such reinforcement fiber dispensers are known art for such uses as making preforms for large structural parts, as in the auto industry, for example.

Typically, the sprayed up or deposited fibers are dusted with a powdered binder, and compressed with a second perforated mold. Hot air and pressure sets the binder, producing a preform of reinforcement fibers which can be stored and shipped to the ultimate molding customer which applies resin to the preform and molds the resinated preform to make a reinforced product, typically using a resin injection process. The process of cutting continuous reinforcement fibers into discrete lengths of reinforcement fibers is useful in the manufacture of laminates as well as in the manufacture of preforms. Dispensers of reinforcement fibers for the manufacture of laminates can also be adapted to be moveable and programmable.

As the technical requirements for reinforcement products increases, new methods for dispensing and laying down reinforcement fibers are required. One requirement is that the reinforcement fibers be delivered at faster speeds than used previously. Another requirement is that the reinforcement fibers be laid down in varying degrees of thickness or density over the collection surface to achieve the desired reinforcement result. The advancement in the preform making technology enabling a moveable and programmable reinforcement fiber dispenser has led to requirements for very sophisticated fiber patterns and orientations. Preforms can be designed with specific amounts and orientations of reinforcement fibers to improve the strength of the molded product precisely at the weakest or most stressed location of the product to be molded. Because of this new sophistication, there often is a requirement that the fibers be laid onto the collecting surface in a very controlled manner.

Efforts to vary the delivery, particularly the width of the flow of chopped fibers dispensed by the fiber dispenser, have not been entirely successful, especially at the high speeds necessary for commercially successful operations. When typical strand chopper nozzles are operated at a faster speed, the resulting discrete reinforcement fibers cannot be successfully laid down in pattern that is as controlled as is desired.

It is clear that improvements in cutting continuous reinforcement fibers into discrete lengths and dispensing them in a controlled manner, enabling a more prescise distribution of fibers, would be desirable.

SUMMARY OF THE INVENTION

The above objects as well as other objects not specifically enumerated are achieved by a method of dispensing a reinforcement strand including the steps of chopping the reinforcement strand into discrete reinforcement fibers, directing the discrete reinforcement fibers into a dispensing nozzle so that the discrete reinforcement fibers travel along a path extending generally along a longitudinal axis of the nozzle, introducing a fluid into the nozzle in a circumferential direction with respect to the longitudinal axis, thereby creating a vortex of the fluid surrounding the discrete reinforcement fibers in the nozzle, dispensing the discrete length reinforcement fibers from the nozzle as a flow, and controlling the flow of fibers dispensed from the nozzle by controlling the fluid introduced into the nozzle.

In another embodiment of the invention, the method of dispensing a reinforcement strand includes the steps of chopping the reinforcement strand into discrete reinforcement fibers, directing the discrete reinforcement fibers into a dispensing nozzle so that the discrete reinforcement fibers travel along a path extending generally along a longitudinal axis of the nozzle, introducing a fluid into the nozzle in a circumferential direction with respect to the longitudinal axis, thereby creating a vortex of the fluid surrounding the discrete reinforcement fibers in the nozzle, wherein the fluid is supplied at a pressure within the range of from about 1 to about 10 bar, as measured just outside the nozzle, dispensing the discrete length reinforcement fibers from the nozzle as a flow, establishing an angle of the flow of the fibers, with respect to the longitudinal axis of the nozzle, that is within the range of from about 10 to about 35 degrees, and controlling the angle of the flow of fibers dispensed from the nozzle by controlling the fluid introduced into the nozzle.

In yet another embodiment of the invention, the method of dispensing a reinforcement strand includes chopping the reinforcement strand into discrete reinforcement fibers with a chopper mounted on the articulation arm, directing the discrete reinforcement fibers into a dispensing nozzle so that the discrete reinforcement fibers travel along a path extending generally along a longitudinal axis of the nozzle, introducing a fluid into the nozzle in a circumferential direction with respect to the longitudinal axis, thereby creating a vortex of the fluid surrounding the discrete reinforcement fibers in the nozzle, dispensing the discrete length reinforcement fibers from the nozzle as a flow, moving the nozzle according to a pattern to create a reinforcement fiber preform on a collection surface, and controlling the flow of fibers dispensed from the nozzle by controlling the fluid introduced into the nozzle.

Various objects and advantages of this invention will become apparent to those skilled in the art from the follow-

DETAILED DESCRIPTION AND PREFERRED EMBODIMENTS OF THE INVENTION

Figure 1:
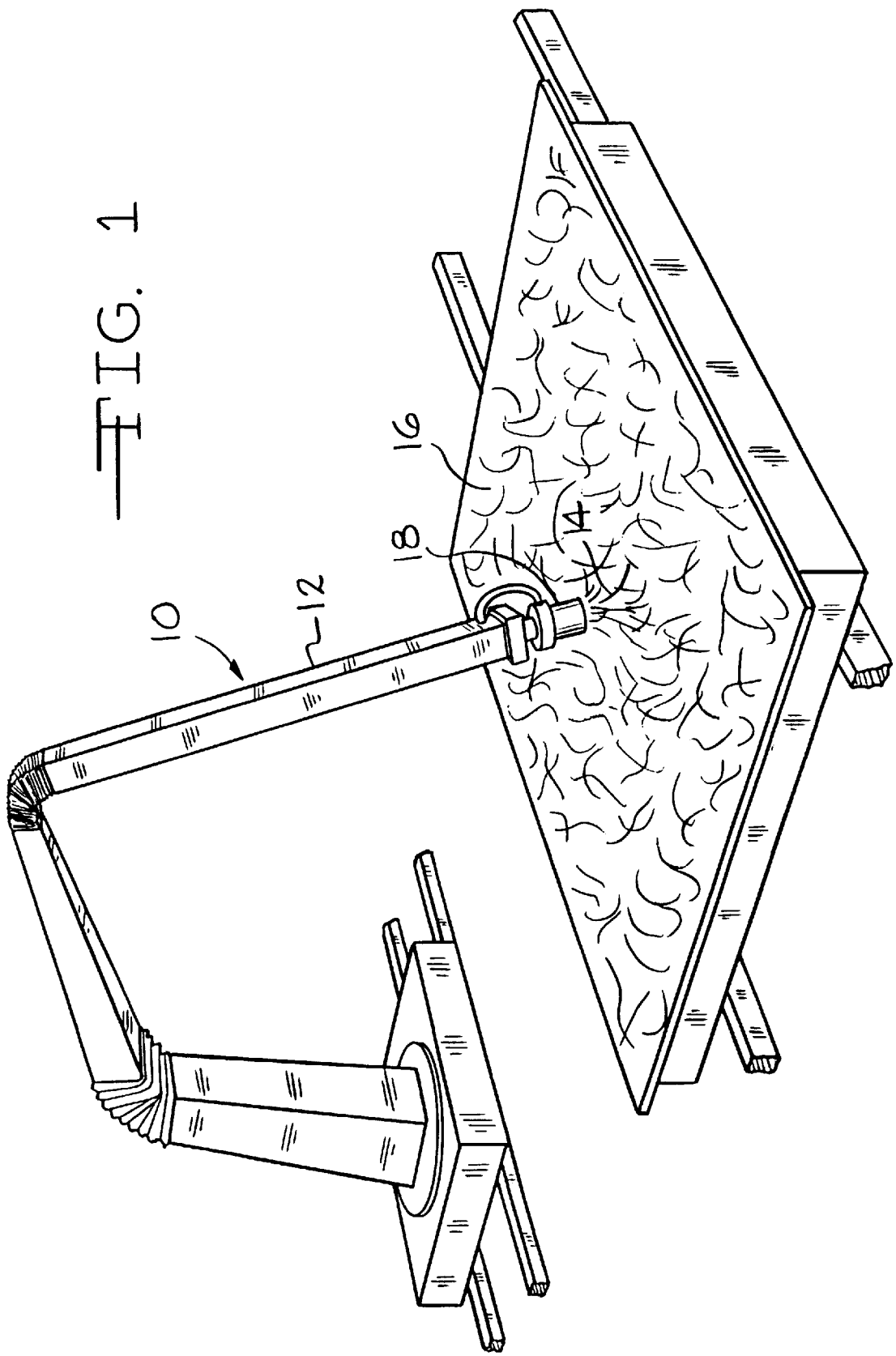
FIG. 1 is a schematic view in perspective illustrating a reinforcement dispenser depositing discrete reinforcement fibers onto a preform molding surface according to the method of the invention.

As shown in FIG. 1, a robotized reinforcement dispenser 10, which includes an articulation arm 12, is positioned to deposit discrete reinforcement fibers 14 onto a collection surface, such as preform molding surface 16. Typically the preform molding surface is a screen. The reinforcement dispenser need not be robotized or automated, and could even be stationary with the collection surface being moveable. A source of vacuum is usually positioned beneath the screen to facilitate the preform making process. The articulation arm can be provided with a hydraulic system or other similar system to enable the articulation arm to be positioned adjacent or above any portion of the collection surface. The movement of the articulation arm can be controlled by a computer, not shown, according to a predetermined pattern so that a desired pattern of reinforcement fiber is laid down on the collection surface.

A continuous reinforcement fiber or strand, such as a roving, not shown in FIG. 1, is supplied from a source not shown, and is transported to the fiber dispenser and through the articulation arm. The continuous reinforcement fiber is chopped or cut at the end of the articulation arm to produce the discrete length reinforcement fibers. The continuous reinforcement fiber can be any material suitable for reinforcement purposes. A preferred material is assembled glass fiber roving, available from Owens-Corning Fiberglas Corporation, Toledo, Ohio, although other mineral fibers and organic fibers, such as polyester, Kevlar® and carbon fibers, can be used with the invention. It is to be understood that the continuous fiber can be a single filament (monfilament) or a strand comprised of numerous filaments. Typically the invention is used with a glass fiber roving consisting of anywhere from about 2200 to about 4800 tex, where a tex is defined as one gram per 1000 meters of filament. Usually the roving is formed by combining a plurality of strands, with each strand being about 25 to about 100 tex.

Figure 2:
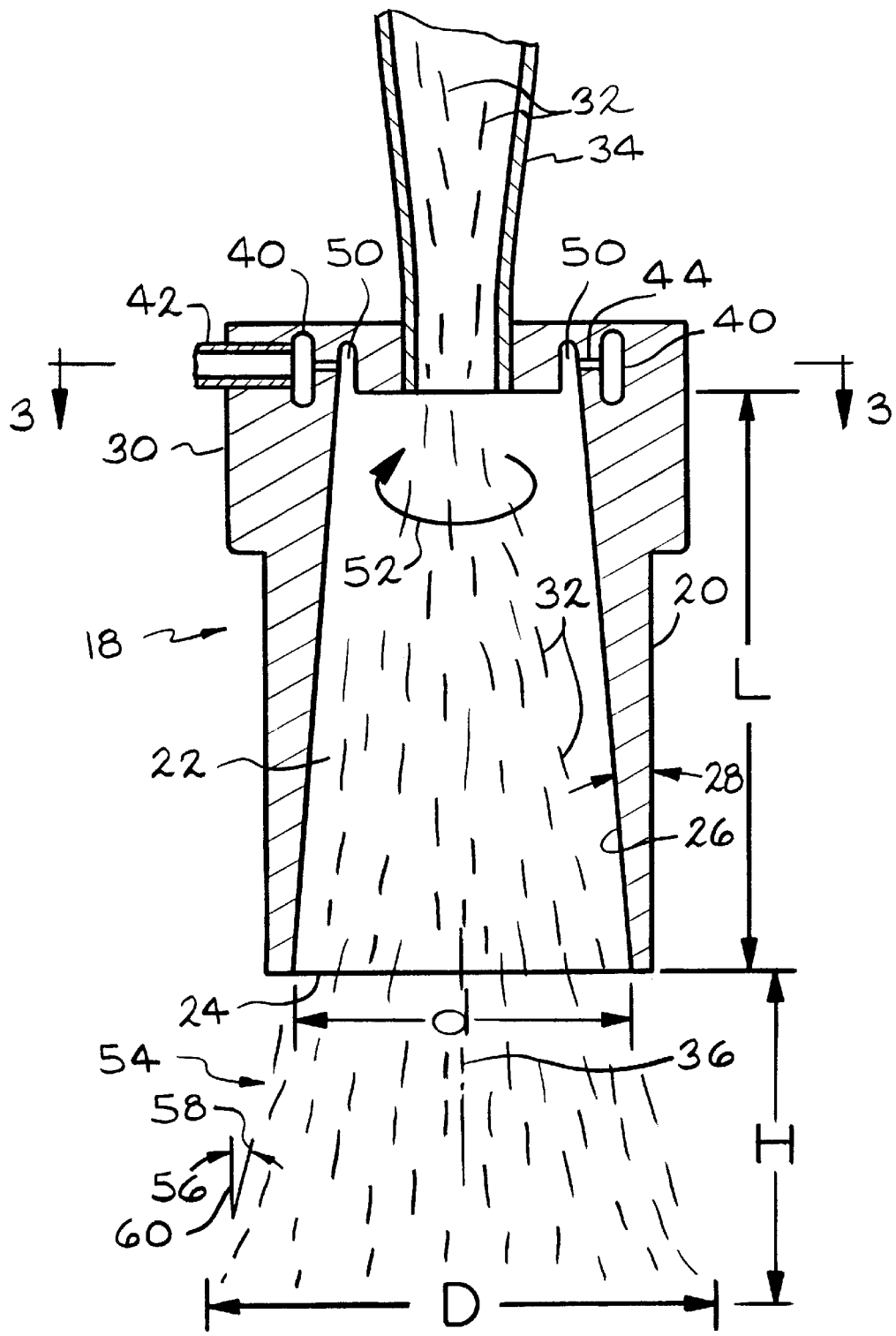
FIG. 2 is a schematic view in elevation of the nozzle of the dispenser of FIG. 1.
Figure 3:
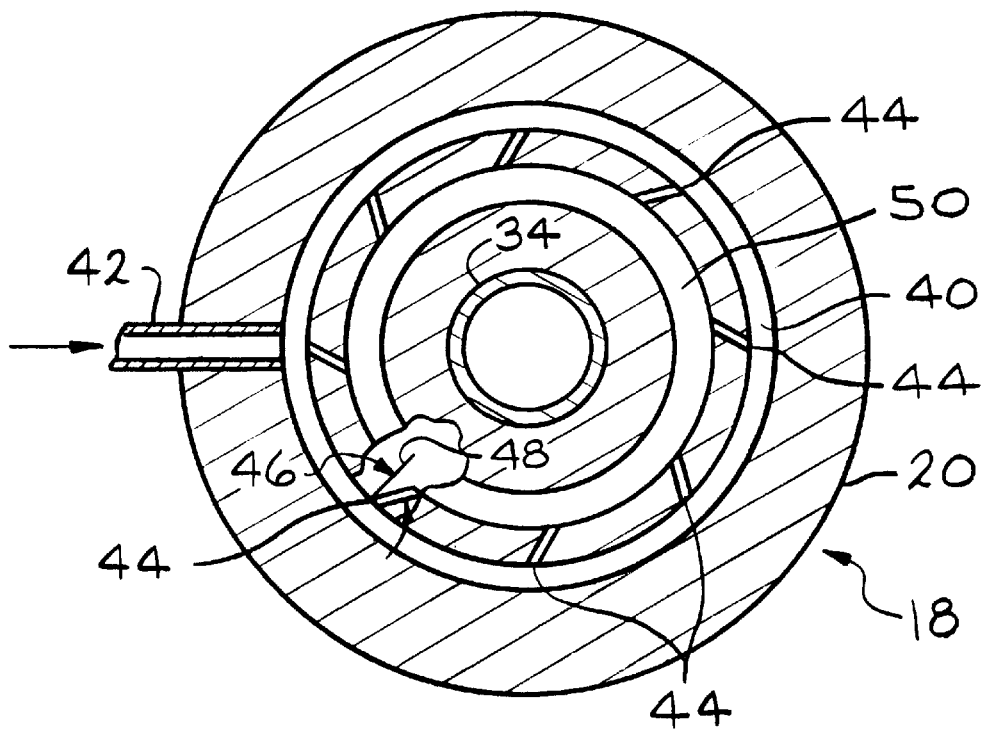
FIG. 3 is a schematic plan view of the nozzle, taken along lines 3—3 of FIG. 2.

The chopped reinforcement fiber is dispensed by a nozzle 18 mounted at the end of the articulation arm 12. As shown in FIGS. 2 and 3, the nozzle is comprised of a generally cylindrical sidewall 20 defining an interior portion or nozzle chamber 22, having an open end or bottom 24. The sidewall 20 preferably has a tapered or angled interior wall surface 26, with an interior angle 28 within the range of from about 0 to about 20 degrees. The angling or tapering of the interior wall surface 26 helps to disburse the fibers exiting the nozzle in a wider flow of fibers.

The nozzle is supplied at its upper end 30 with a stream of fibers 32 traveling through the fiber chute 34. The fiber chute can be any conduit capable of supplying and directing the fibers into the nozzle. The fibers travel through the nozzle along a path substantially parallel to the longitudinal axis 36 of the nozzle.

The nozzle contains features that direct a fluid into the nozzle for the purpose of spreading out or flaring the stream of fibers in the nozzle. An annular manifold 40 is positioned to surround the fiber chute 34. The manifold is supplied with a fluid via inlet conduit 42 which extends through the nozzle wall 20. The fluid can be any material suitable for affecting the path of travel of the fibers in the nozzle. A preferred fluid is air, but other gases or even liquids can be used. Some of the alternate fluids could be adapted to provide surface treatments or other fiber quality-affecting enhancements. The temperature and moisture content of the fluid can be set to positively affect the fiber quality and properties. Varying the temperature of the air might affect the density of the air. A preferred pressure of the fluid, as measured in the inlet conduit immediately before entering the nozzle and manifold, is within the range of from about 1 to about 10 bar, although other pressures can be used.

Once in the manifold, the fluid is discharged through discharge passageways 44 to introduce the fluid into the nozzle 18. Any number of discharge passageways 44 can be used. For maximum vortex effect it is preferable for the discharge passageways 44 to be tangent to the annular slot 50. However, it is to be understood that the discharge passageways can be oriented at any angle 46 within the range of from about 45 to about 90 (i.e., tangent) degrees to a radius 48 of the nozzle, as shown in the partially cut away portion in FIG. 3. When the fluid enters the nozzle the fluid is conducted or introduced into an annular slot 50 that opens downwardly into the nozzle chamber. The orientation of the discharge passageways 44 at a tangent to the radius 48 of the nozzle means that the fluid is introduced into the nozzle in a circumferential direction with respect to the longitudinal axis 36. This creates a vortex of swirling air, as indicated by directional arrow 52, surrounding the discrete length reinforcement fibers 32. The vortex travels down the length of the nozzle, toward the bottom 24. The effect of the vortex or swirling air is to cause the fibers 32 traveling inside the nozzle to disperse into a wider stream. As the fibers exit the nozzle, the flow 54 of the fibers is made wider by the action of the vortex.

The spread or angle 56 of the flow of fibers 54 can be approximated by comparing a line 58 generally parallel to the outer periphery of the flow 54 of fibers with a line 60 parallel to the longitudinal axis 36 of the nozzle. The angle 56 of the flow of fibers is a function, in part, of the effect of the vortex on the fibers. Therefore, the flow of fibers dispensed from the nozzle can be controlled by controlling the fluid entering the nozzle. For example, if the flow 54 of fibers has an angle of flow 56 of about 10 degrees occurring without the introduction of any fluid, establishing the introduction of fluid through the manifold 40 and slot 50 in the manner disclosed might increase the angle of flow to about 30 degrees. It can be seen that by varying the introduction of fluid into the nozzle, the deposition of reinforcement fibers on the collecting surface can be significantly controlled. A further level of sophistication can be achieved by coordinating the flow of fluid into the nozzle with the movement of the articulation arm 12 of the dispenser. Both the fluid and the articulation arm can be moved according to patterns to create preforms having desired characteristics. As an example, if a particular area of the preform requires a higher than normal concentration of chopped reinforcement fiber, the fluid flow into the nozzle can be reduced during the time the nozzle is directing the fibers to that particular area, thereby reducing the angle of flow and concentrating the fibers on the specific area.

The nozzle need not have any particular dimensions, but the diameter d of the nozzle is preferably within the range of from about 15 to about 90 mm, and most preferably within the range of from about 25 to about 50 mm. The length L of the nozzle is preferably within the range of from about 40 to about 200 mm, and most preferably within the range of from about 50 to about 90 mm. The flow angle 56 of the fibers can be measured by determining the diameter or spray pattern width D of the fiber flow at a specific distance H from the nozzle outlet 24. A typical ratio of distance H to width W is within the range of from about 5:1 to about 1:1, and preferably within the range of from about 5:1 to about 2:1.

Figure 4:
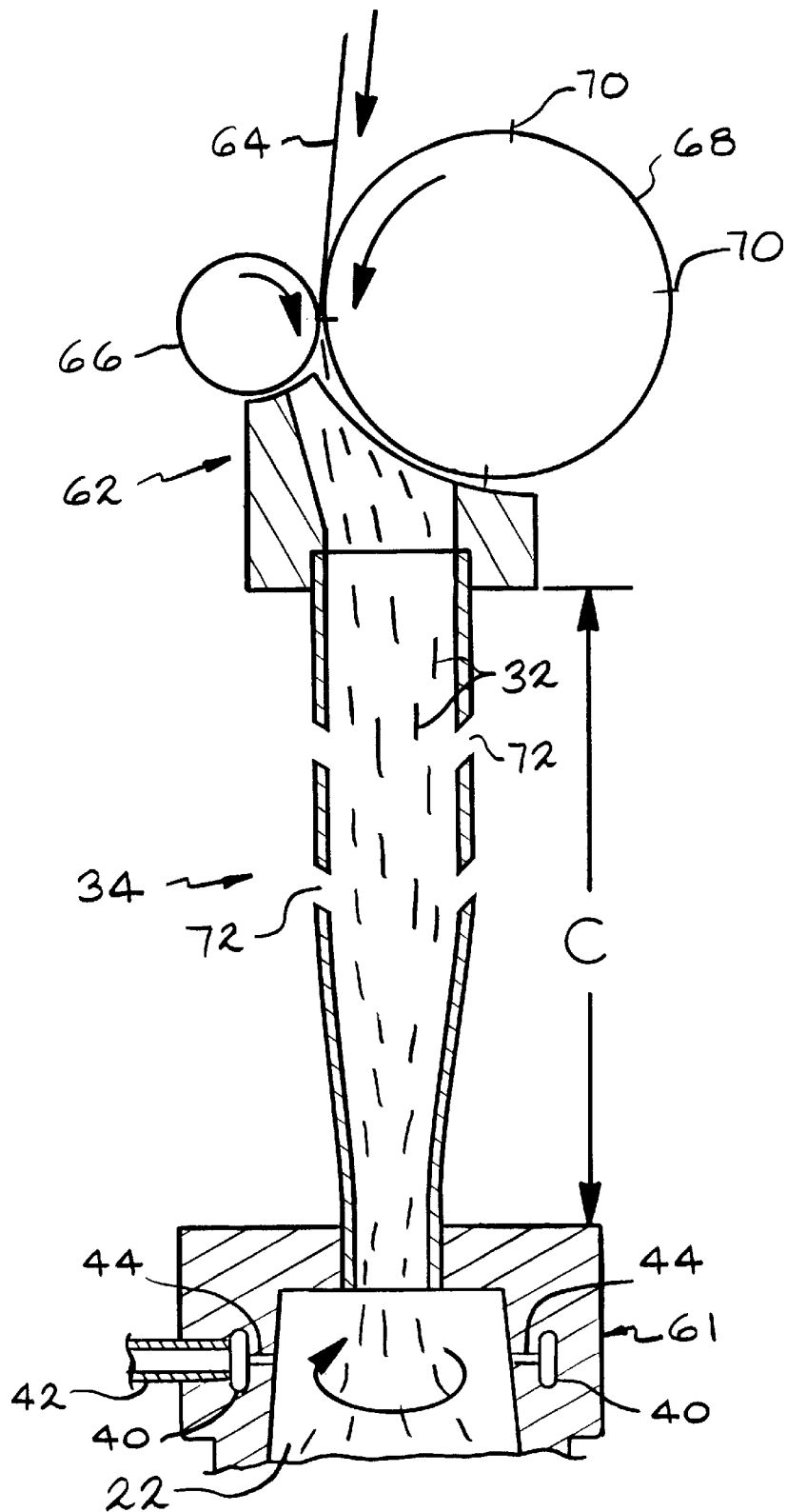
FIG. 4 is schematic view, similar to FIG. 2, of another embodiment of the nozzle.

As shown in FIG. 4, another embodiment of the nozzle, nozzle 61, can be configured so that there is no downwardly opening slot, such as slot 50 illustrated in FIGS. 2 and 3. Instead, the discharge passageways 44 open up directly into the interior 22 of the nozzle 60.

The nozzle 60 is also shown as being coupled with a fiber chute 34' and a chopper 62. The chopper can be any chopper suitable for chopping the continuous strand or roving 64. Conventional choppers are well known to those skilled in the art, and typically comprise a backup roll or cot roll 66 and a cutter roll 68 outfitted with blades 70. Typical lengths of the chopped reinforcement fibers is within the range of from about 15 to about 100 mm.

The fiber chute 34' is preferably downwardly converging, i.e., inwardly tapered in the downward direction, at an angle within the range of from about 5 to about 20 degrees. The fiber chute can be provided with air escape ports 72 to enable the removal of air traveling with the fibers before the fibers reach the nozzle. The length of the chute C is preferably within the range of from about 0.5 to about 1.5 times the length L of the nozzle.

The principle and mode of operation of this invention have been described in its preferred embodiments. However, it should be noted that this invention may be practiced otherwise than as specifically illustrated and described without departing from its scope.

What is claimed is:

1. A method of dispensing a reinforcement strand comprising:
    chopping the reinforcement strand into discrete reinforcement fibers;
    directing the discrete reinforcement fibers into a dispensing nozzle so that the discrete reinforcement fibers travel along a path extending generally along a longitudinal axis of the nozzle;
    introducing a fluid into an annular manifold of the nozzle, the fluid traveling in a circumferential direction with respect to the longitudinal axis, thereby creating a vortex of the fluid surrounding the discrete reinforcement fibers of the nozzle;
    dispensing the discrete length reinforcement fibers from the nozzle as a flow; and
    controlling the flow of fibers dispensed from the nozzle by controlling the fluid introduced into the nozzle.

2. The method of claim 1 in which the step of introducing the fluid into the nozzle includes directing the fluid from the annular manifold into an annular slot that opens downwardly into a nozzle chamber within the nozzle.

3. The method of claim 1 in which the step of conducting the fluid into the manifold includes supplying the fluid at a pressure within the range of from about 1 to about 10 bar, as measured just outside the nozzle.

4. The method of claim 1 in which the nozzle has an interior portion defined by an interior wall which is at an interior angle to the longitudinal axis of the nozzle, the angle being within the range of from about 0 to about 20 degrees.

5. The method of claim 1 in which the step of controlling the flow of fibers dispensed from the nozzle includes establishing an angle of the flow of the fibers, with respect to the longitudinal axis of the nozzle, that is within the range of from about 10 to about 35 degrees.

6. The method of claim 1 including mounting the nozzle on an articulation arm, dispensing the discrete length reinforcement fibers from the nozzle, and moving the nozzle according to a pattern to create a reinforcement fiber preform on a collection surface.

7. The method of claim 6 including chopping the reinforcement strand into discrete reinforcement fibers with a chopper mounted on the articulation arm.

8. The method of claim 7 including conveying the chopped reinforcement fibers from the chopper to the nozzle with a converging fiber chute.

9. The method of claim 8 including removing air traveling with the chopped reinforcement fibers from the chute before the chopped reinforcement fibers reach the nozzle.

10. A method of dispensing a reinforcement strand comprising:
    chopping the reinforcement strand into discrete reinforcement fibers;
    directing the discrete reinforcement fibers into a dispensing nozzle so that the discrete reinforcement fibers travel along a path extending generally along a longitudinal axis of the nozzle;
    introducing a fluid into an annular manifold of the nozzle in a circumferential direction with respect to the longitudinal axis, thereby creating a vortex of the fluid surrounding the discrete reinforcement fibers of the nozzle, wherein the fluid is supplied at a pressure within the range of from about 1 to about 10 bar, as measured just outside the nozzle;
    dispensing the discrete length reinforcement fibers from the nozzle as a flow;
    establishing an angle of the flow of the fibers, with respect to the longitudinal axis of the nozzle, that is within the range of from about 10 to about 25 degrees; and
    controlling the angle of the flow of fibers dispensed from the nozzle by controlling the fluid introduced into the nozzle.

11. The method of claim 10 in which the step of introducing the fluid into the nozzle includes directing the fluid from the annular manifold into an annular slot that opens downwardly into a nozzle chamber within the nozzle.

12. The method of claim 11 in which the nozzle has an interior portion defined by an interior wall which is at an interior angle to the longitudinal axis of the nozzle, the angle being within the range of from about 0 to about 20 degrees.

13. The method of claim 12 including mounting the nozzle on an articulation arm, dispensing the discrete length reinforcement fibers from the nozzle, and moving the nozzle according to a pattern to create a reinforcement fiber preform on a collection surface.

14. The method of claim 13 including chopping the reinforcement strand into discrete reinforcement fibers with a chopper mounted on the articulation arm.

15. The method of claim 14 including conveying the chopped reinforcement fibers from the chopper to the nozzle with a converging fiber chute, and removing air traveling with the chopped reinforcement fibers from the chute before the chopped reinforcement fibers reach the nozzle.

16. A method of dispensing a reinforcement strand comprising:

chopping the reinforcement strand into discrete reinforcement fibers;

directing the discrete reinforcement fibers into a dispensing nozzle so that the discrete reinforcement fibers travel along a path extending generally along a longitudinal axis of the nozzle;

introducing a fluid into an annular manifold of the nozzle, the fluid traveling in a circumferential direction with respect to the longitudinal axis, thereby creating a vortex of the fluid surrounding the discrete reinforcement fibers of the nozzle;

dispensing the discrete length reinforcement fibers from the nozzle as a flow;

moving the nozzle according to a pattern to create a reinforcement fiber preform on a collection surface; and controlling the flow of fibers dispensed from the nozzle by controlling the fluid introduced into the nozzle.

17. The method of claim 16 including mounting the nozzle on an articulation arm, dispensing the discrete length reinforcement fibers from the nozzle.

18. The method of claim 17 including conveying the chopped reinforcement fibers from the chopper to the nozzle with a converging fiber chute.

19. The method of claim 18 including removing air traveling with the chopped reinforcement fibers from the chute before the chopped reinforcement fibers reach the nozzle.

20. A method of dispensing a reinforcement strand comprising:

chopping the reinforcement strand into discrete reinforcement fibers;

removing air traveling with the discrete reinforcement fibers from a converging fiber chute;

directing the discrete reinforcement fibers into a dispensing nozzle;

introducing a fluid into the nozzle in a circumferential direction with respect to a longitudinal axis of the nozzle, thereby creating a vortex of the fluid surrounding the discrete reinforcement fibers of the nozzle; and dispensing the discrete length reinforcement fibers from the nozzle as a flow.

21. The method according to claim 20 wherein the air is removed from the converging fiber chute through at least one air escape port located on the converging fiber chute.

22. The method according to claim 20 further including the step of moving the nozzle according to a pattern to create a reinforcement fiber preform on a collection surface.

23. The method according to claim 20 further including the step of establishing an angle of the flow of the fibers with respect to the longitudinal axis of the nozzle, the angle being within the range of from about 10 to about 25 degrees.

24. The method according to claim 23 further including the step of controlling the angle of the flow of fibers dispensed from the nozzle by controlling the fluid introduced into the nozzle.

25. The method according to claim 20 in which the step of introducing the fluid into the nozzle includes conducting the fluid into an annular manifold.

26. The method according to claim 25 further including the step of directing the fluid from the annular manifold into an annular slot that opens downwardly into a nozzle chamber within the nozzle.

27. The method according to claim 25 in which the step of conducting the fluid into the manifold includes supplying the fluid at a pressure within the range of from about 1 to about 10 bar, as measured just outside the nozzle.

28. The method according to claim 20 in which the nozzle has an interior portion defined by an interior wall which is at an interior angle to the longitudinal axis of the nozzle, the angle being within the range of from about 0 to about 20 degrees.

29. The method according to claim 20 further including the step of mounting the nozzle on an articulation arm.

* * * * *